United States Patent
Saito

(10) Patent No.: US 8,805,667 B2
(45) Date of Patent: Aug. 12, 2014

(54) PRINT CONTROL DEVICE

(75) Inventor: Takuma Saito, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 392 days.

(21) Appl. No.: 13/053,279

(22) Filed: Mar. 22, 2011

(65) Prior Publication Data

US 2012/0050791 A1    Mar. 1, 2012

(30) Foreign Application Priority Data

Aug. 25, 2010   (JP) ................................. 2010-188071

(51) Int. Cl.
 *G06F 9/455* (2006.01)
 *G06F 13/00* (2006.01)

(52) U.S. Cl.
 USPC .......... 703/25; 358/1.13; 358/1.14; 358/1.15; 358/1.16; 358/1.1; 703/24

(58) Field of Classification Search
 CPC ... G06F 13/102; G06F 13/105; G06F 13/107; G06F 9/455; G06F 9/45504; G06F 9/4411; G06F 11/261; G06F 3/0664; H04L 67/2861; H04L 67/08
 USPC ................ 358/1.1, 1.11–1.18, 504, 400–407; 710/1, 240, 316, 10, 104, 313, 8; 703/24, 25; 714/E11.168
 See application file for complete search history.

(56) References Cited

U.S. PATENT DOCUMENTS

| | | | | |
|---|---|---|---|---|
| 6,216,176 | B1 * | 4/2001 | Kadota | 710/1 |
| 7,698,122 | B2 * | 4/2010 | Chrysanthakopoulos | 703/24 |
| 8,346,981 | B2 * | 1/2013 | Scaffidi, Jr. | 710/8 |
| 8,412,508 | B2 * | 4/2013 | Chrysanthakopoulos | 703/24 |
| 2003/0084132 | A1 * | 5/2003 | Ohta | 709/221 |
| 2004/0036908 | A1 * | 2/2004 | Yagita et al. | 358/1.15 |
| 2004/0190042 | A1 * | 9/2004 | Ferlitsch et al. | 358/1.15 |
| 2005/0071495 | A1 | 3/2005 | Kadota | |
| 2005/0237565 | A1 | 10/2005 | Maeda | |

(Continued)

FOREIGN PATENT DOCUMENTS

| | | |
|---|---|---|
| CN | 1462935 A | 12/2003 |
| CN | 1892576 A | 1/2007 |

(Continued)

OTHER PUBLICATIONS

Notification of Reason for Refusal for corresponding Japanese Patent Application 2010-188071 dated Jun. 19, 2012.

(Continued)

*Primary Examiner* — Chad Dickerson
(74) *Attorney, Agent, or Firm* — Banner & Witcoff, Ltd.

(57) ABSTRACT

A print control device includes: a creation unit that creates print data; an output unit that outputs the print data created by the creation unit to a printing device through a designated port; a determination unit that determines whether or not the print data is to be output to a non-connected port that is a port not connected to the printing device; and a display unit which, when the determination unit determines that the print data has been output to the non-connected port, displays at least one of a first operation screen that is an operation screen for instructing port switching and a second operation screen that is an operation screen for instructing deletion of the print data.

10 Claims, 9 Drawing Sheets

(56) References Cited

U.S. PATENT DOCUMENTS

| | | |
|---|---|---|
| 2007/0003308 A1* | 1/2007 | Kim .............................. 399/81 |
| 2009/0070660 A1 | 3/2009 | Poirier |
| 2010/0182638 A1 | 7/2010 | Kimura et al. |
| 2011/0194136 A1 | 8/2011 | Liu et al. |

FOREIGN PATENT DOCUMENTS

| | | |
|---|---|---|
| CN | 101364167 A | 2/2009 |
| JP | 2000-267824 | 9/2000 |
| JP | 2003-167704 | 6/2003 |
| JP | 2004094312 A | 3/2004 |
| JP | 2005-196573 | 7/2005 |
| JP | 2008-108010 | 5/2008 |

OTHER PUBLICATIONS

Extended European Search Report in corresponding European Patent Application No. 11159270.5 dated Apr. 16, 2013.

Oct. 8, 2013 Office Action issued in Chinese Patent Application No. 201110079941.5.

\* cited by examiner

PRINT CONTROL DEVICE

CROSS-REFERENCE TO RELATED APPLICATIONS

This application claims priority from Japanese Patent Application No. 2010-188071 filed on Aug. 25, 2010, the entire subject matter of which is incorporated herein by reference.

TECHNICAL FIELD

The present invention relates to a print control device and a program thereof for outputting a print job to a printing device.

BACKGROUND

There has been proposed a system, in which print jobs are output to a printing device (for example, a printer) and printing is executed, such a print job is transferred from a print control device (for example, a personal computer (PC)) that is an output source to the printing device via a print port set in the print control device.

For example, one related art discloses a technology of transferring print jobs via a print port. This related art further discloses a printer driver that stores print data when the printer port is not connected to a printer, and sequentially outputs the stored print data to the printer when the connection of the printer port to the printer is confirmed.

SUMMARY

The above-described related-art technology has the following problem. That is, the print data remains in the print control device as long as the communication with the printer is not established. For this reason, usable areas of resources are limited. Specifically, when a wrong port is set, the connection to a printing device will not be established until the setting is adjusted. Thus, the stored print data keeps increasing, thereby making the problem serious.

The invention aims to solve the problem of the above-described related art. Illustrative aspects of the invention provide a print control device and a program thereof by which a long-term retention of print data is expected to be avoided.

According to a first aspect of the invention, there is provided a print control device comprising: a creation unit that creates print data; an output unit that outputs the print data created by the creation unit to a printing device through a designated port; a determination unit that determines whether or not the print data is to be output to a non-connected port that is a port not connected to the printing device; and a display unit which, when the determination unit determines that the print data has been output to the non-connected port, displays at least one of a first operation screen that is an operation screen for instructing port switching and a second operation screen that is an operation screen for instructing deletion of the print data.

The print control device of the invention determines whether or not print data is output to a non-connected port when a print job is received. As for the non-connected port, a port set with a wrong address or a virtual port that is not connected to a real printing device is one example. In addition, when it is determined that the print data is set to be output through the non-connected port, an operation screen for instructing switching of the port or deletion of the print data is displayed.

In other words, when the non-connected port is designated, the print control device of the invention prompts the switching of the port by displaying the first operation screen so that shift to another port that is connected to the printing device can be expected. When the switching to the port is completed, the print data is output via the port thereafter. Accordingly, accumulation of the print data can be avoided. Or, when the non-connected port is designated, deletion of the print data is prompted with the display of the second operation screen, and the deletion of the print data can be expected. Accordingly, the print data is not easily accumulated.

According to another aspect of the invention, there is provided a print control method by a print control device having a port connectable to a printing device, the print control method comprising: creating print data; outputting the print data to a printing device through a designated port; determining whether or not the print data is to be output to a non-connected port that is a port not connected to the printing device; and when it is determined that the print data has been output to the non-connected port, displaying at least one of a first operation screen that is an operation screen for instructing port switching and a second operation screen that is an operation screen for instructing deletion of the print data.

According to still another aspect of the invention, there is provided a non-transitory computer-readable medium having a computer program stored thereon and readable by a computer, said computer program, when executed by the computer, causes the computer to function as: a creation unit that creates print data; an output unit that outputs the print data created by the creation unit to a printing device through a designated port; a determination unit that determines whether or not the print data is to be output to a non-connected port that is a port not connected to the printing device; and a display unit which, when the determination unit determines that the print data has been output to the non-connected port, displays at least one of a first operation screen that is an operation screen for instructing port switching and a second operation screen that is an operation screen for instructing deletion of the print data.

According to the aspects of the invention, a print control device and a program with which avoidance of long-term retention of print data can be expected are realized.

DETAILED DESCRIPTION

Hereinafter, exemplary embodiments of a print control device according to the invention will be described in detail with reference to accompanying drawings. The exemplary embodiments show that the invention is applied to personal computers (PCs) into which universal printer drivers controlling a plurality of kinds of printers with different functions are incorporated.

(Overall Configuration of Print Control System)

Figure 1:
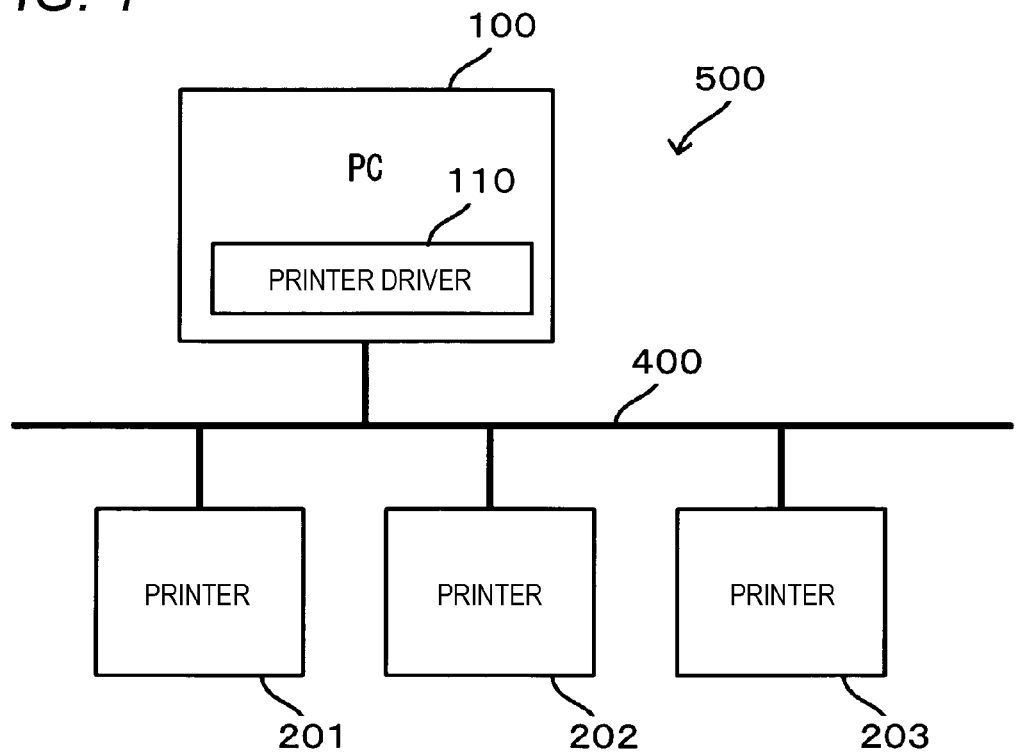
FIG. 1 is a block diagram showing a configuration of a print control system according to an exemplary embodiment of the invention.

As shown in FIG. 1, a print control system 500 in this exemplary embodiment includes a PC 100 (one example of a print control device) that outputs print data to a designated printer, and printers 201, 202, and 203 having a print function. In addition, in the print control system 500, the PC 100 is connected to the printers 201, 202, and 203 through a network 400. Incidentally, each of the printers 201, 202, and 203 is not required to be the same model (or type), but may be different from one another.

The PC 100 is incorporated with a universal printer driver (hereinafter, referred to as a "printer driver 110") that can control a plurality of kinds of printers. In the exemplary embodiment, the printers 201, 202, and 203 are printers that can be compatible with the printer driver 110. When a print job is output from the PC 100 to the printers 201, 202, and 203, the printer driver 110 is used.

Incidentally, the connection of any number of printers and PCs composing the print control system 500 may be made. In addition, other information processing device or image processing device may be connected within the print control system 500.

(Configuration of PC)

Figure 2:
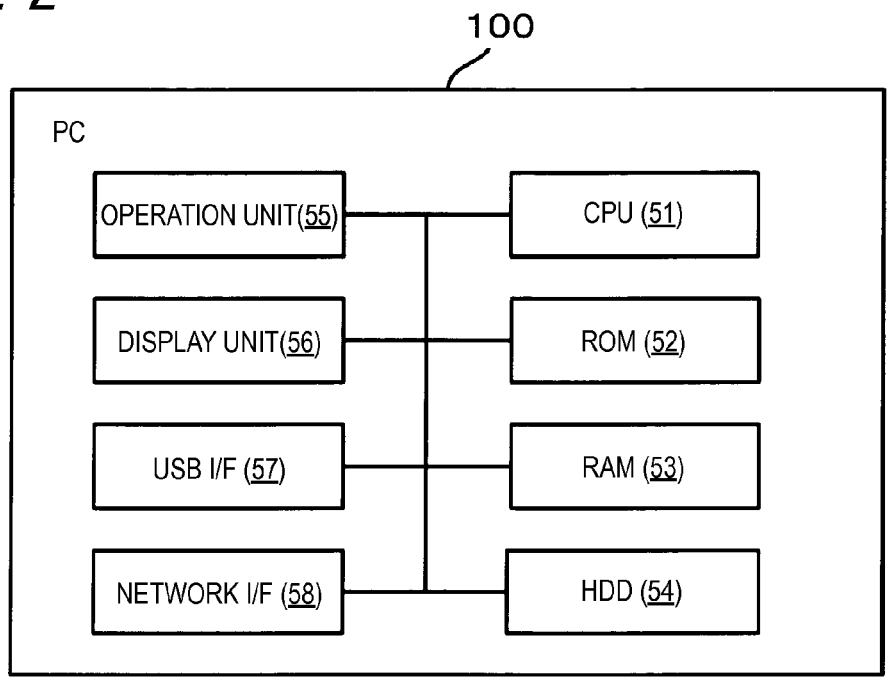
FIG. 2 is a block diagram showing an electric configuration of a PC included in the print control system.

Next, the brief composition of the PC 100 will be described. As shown in FIG. 2, the PC 100 includes a CPU 51, a ROM 52, a RAM 53, a HDD 54, an operation section 55 composed of a keyboard, a mouse, and the like, a display section 56 composed of a liquid crystal display and the like, a USB interface 57, and a network interface 58.

The HDD 54 of the PC 100 is incorporated with an operating system (OS), device drivers controlling various devices, application programs having a print instruction function such as a word processor and a table calculation software, and the like. The above-described printer driver 110 is also incorporated into the HDD 54.

The CPU 51 performs various processes in accordance with a control program read from the ROM 52 and an application program read from the HDD 54 with storing the processing results in the RAM 53 or the HDD 54. The operation of the above-described printer driver 110 is also processed by the CPU 51.

Overview of Printer Driver (1) User Interface

Next, the user interface of the printer driver 110 will be described. The printer driver 110 includes printer ports and a user interface that can set individual attributes of printers.

Figure 3:
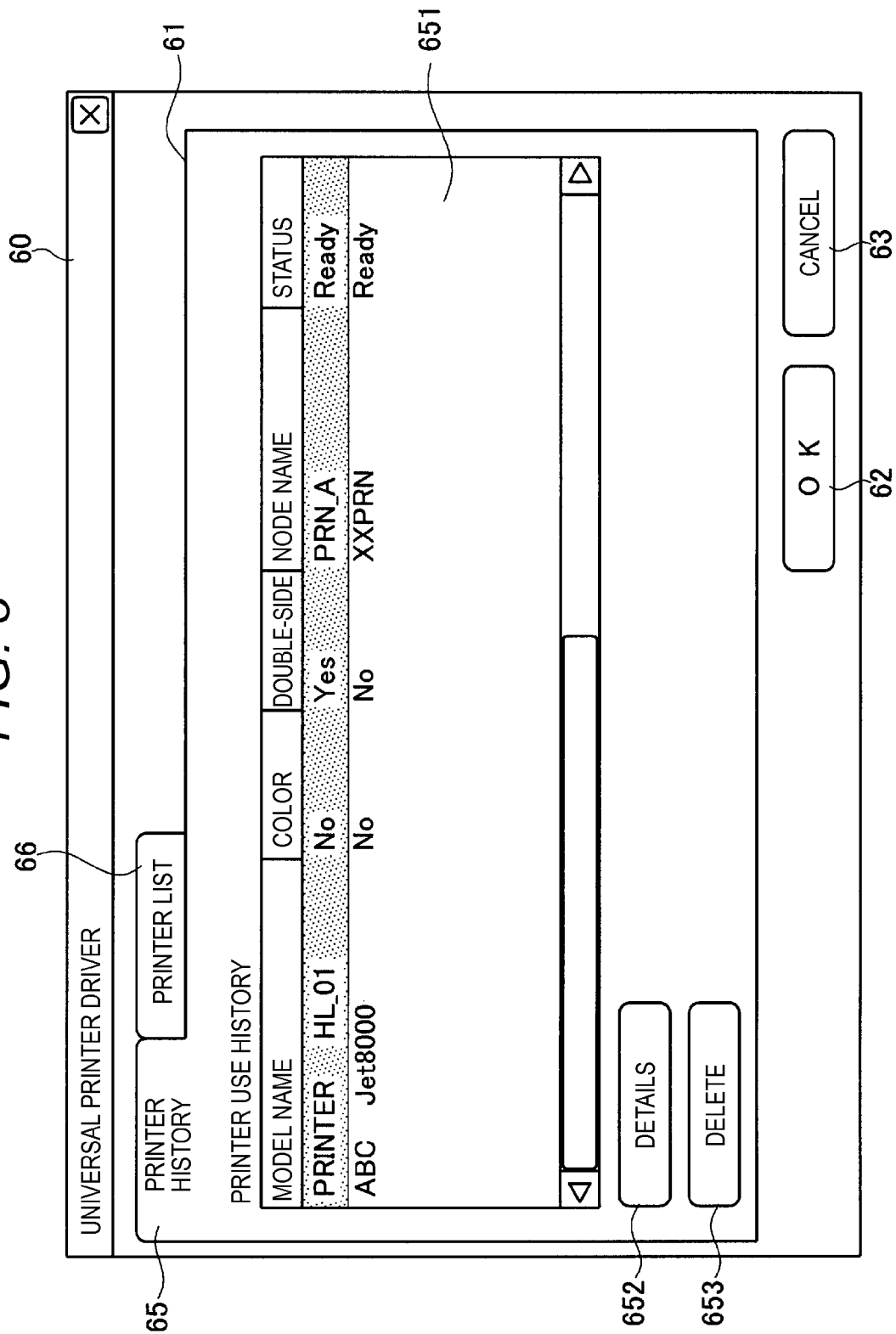
FIG. 3 is a diagram showing a display example (print history screen) of a utility program.

The printer driver 110 of the exemplary embodiment activates a dialog box 60 as shown in FIG. 3 when a user interface display instruction is received. The user interface display instruction may be instructed by the printer driver 110 itself in a data output process (which will be described later), for example, in addition to an instruction by an operation from a user. The dialog box 60 displays a tab 61 displaying printer information, an OK button 62, and a cancel button 63. The tab 61 includes a printer history screen 65 for displaying printer use history, and a printer list screen 66 for displaying a list of printers to which the PC 110 can access.

FIG. 3 shows a state where the printer history screen 65 is displayed. Specifically, the printer history screen 65 displays a list box 651 for displaying the history of used printers, a detail button 652 for displaying the details of printers selected in the list box 651, and a deletion button 653 for deleting a printer selected in the list box 651 from the list. The list box 651 displays information including the model name of a printer, color compatibility, double-side print compatibility, node name, status, and the like. The list box 651 displays used printers from one that is closest from the top in order, and the printer displayed uppermost is a printer designated in the present port. The list box 651 shows a state where one printer displayed is selected.

Figure 4:
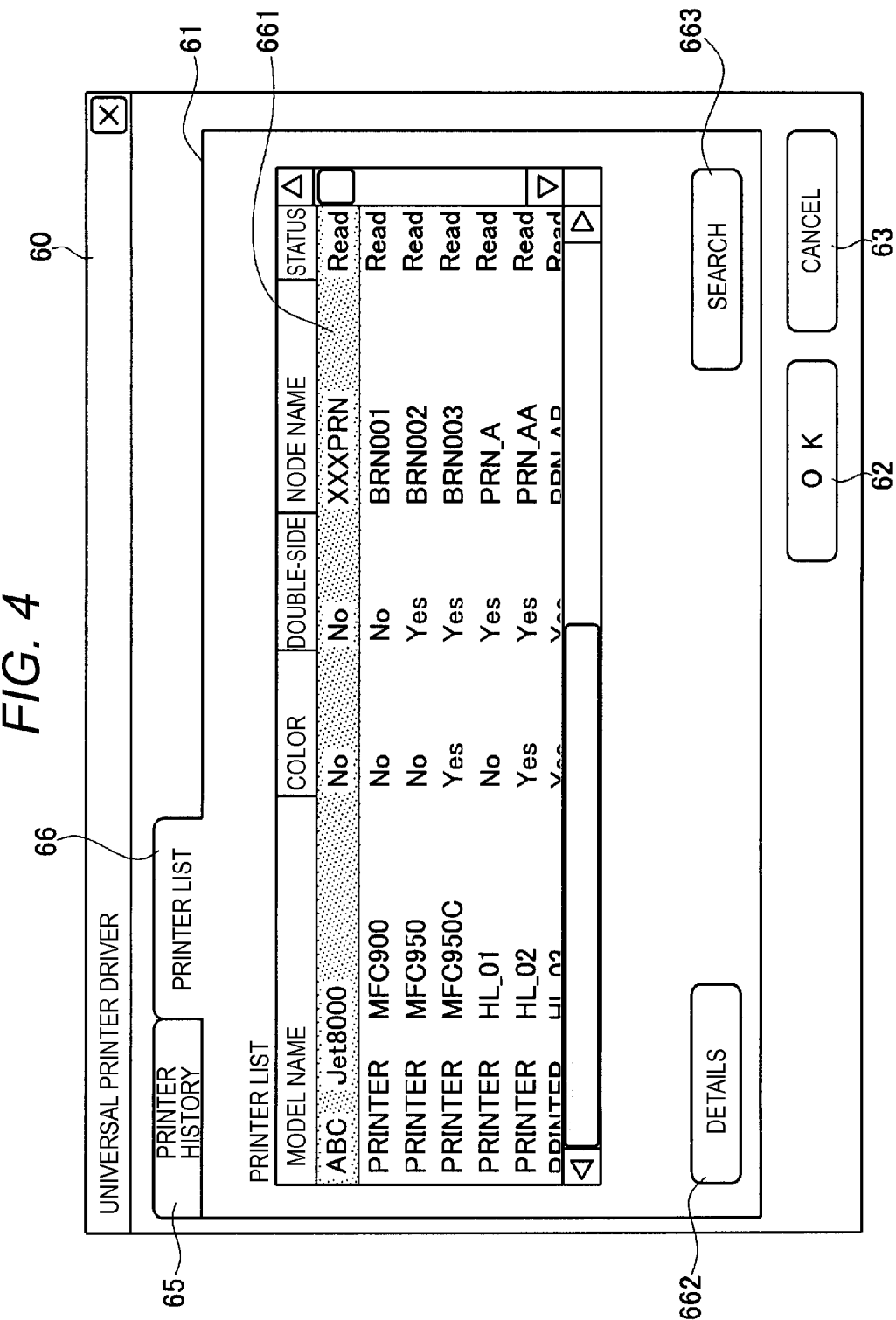
FIG. 4 is a diagram showing a display example (print search screen of the utility program.

FIG. 4 shows a state where the printer list screen 66 (an example of a selection unit and switching unit) is displayed. The printer list screen 66 displays a list box 661 for displaying the list of a printer connected to the PC 100, a detail button 662 for displaying the details of the printer selected in the list box 661, and a search button 663 for searching a printer which the PC 100 can access. The list box 661 displays information including the model name of a printer, color compatibility, double-side print compatibility, node name, status, and the like, as in the list box 651 of the printer history screen 65.

Incidentally, the list box 661 of the printer list screen 66 does not display anything immediately after the dialog box 60 is activated. In other words, the printer driver 110 searches a printer upon the search button 663 being pressed, and then displays the search result. In addition, when the OK button 62 is pressed in a state where a printer is selected in the list box 661, a port of the printer driver 110 is set to the selected printer.

(2) Installation Process

Figure 5:
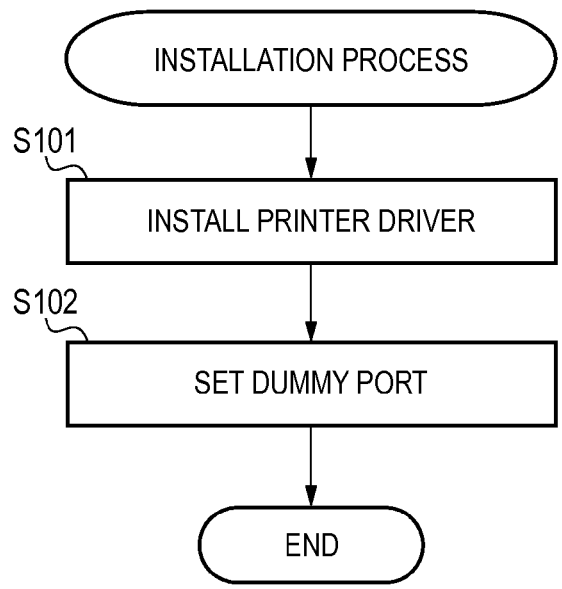
FIG. 5 is a flowchart showing a procedure of an installation process according to the exemplary embodiment of the invention.

Next, referring to the flowchart of FIG. 5, an installation process in which the printer driver 110 is incorporated into the PC 100 will be described. The installation process is executed with an installation program of the printer driver 110.

In the installation process, first, software for the printer driver 110 is installed in the PC 100 (S101). Next, a virtual port that in not connected to any printer (hereinafter, referred to as a "dummy port") is set to a port of the printer driver 110 (Step S102). The installation process ends after S102.

As described above, the dummy port is set in the installation of the printer driver 110 that is a universal printer driver. In the setting, it is difficult to suppose that ports are frequently switched for the use if the driver is a printer driver for a specific model. For this reason, if the driver is a printer driver for a specific model, it is preferable to set a port after searching for the specific printer during installation (or, after a user designates a port corresponding to the specific printer). On the other hand, it is also supposed that the universal printer driver is compatible with a plurality of models, and a user frequently switches ports for the use. For this reason, it is preferable not to specify one printer as an output destination in the stage of installation. For example, when an administrator carries out installation and a user other than the administrator performs printing, it is considered that the user performing the printing does not know the port setting. In this case, when a port has been set during installation, printout may be output from an unintended printer. Therefore, it is preferable that a dummy port is set for port setting during installation in the universal printer driver, thereby avoiding output from the unintended printer.

(3) Deletion Process

Figure 6:
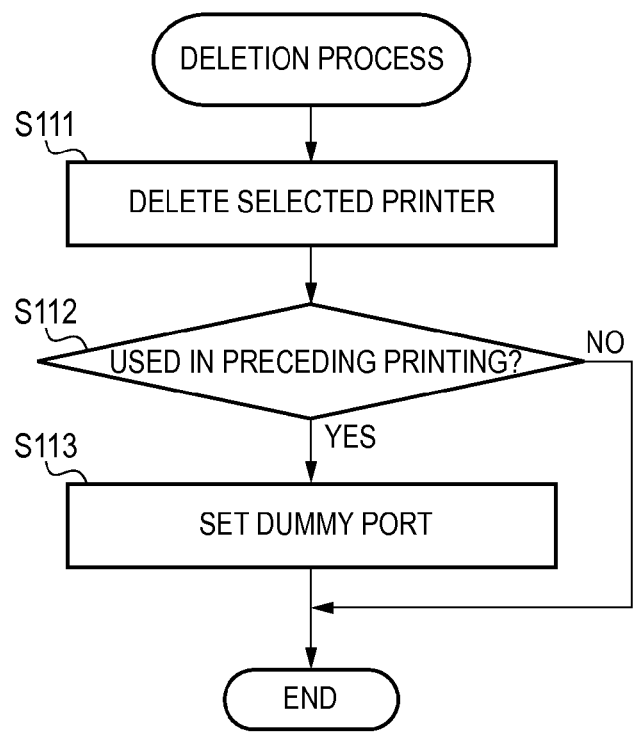
FIG. 6 is a flowchart showing a procedure of a deletion process according to the exemplary embodiment of the invention.

Next, as another example for setting a dummy port, a deletion process (an example of a designation unit) executed when the deletion button 653 in the printer history screen 65 is pressed will be described with reference to the flowchart of FIG. 6.

In the deletion process, first, the printer selected in the list box 651 is deleted from the list (S111). Next, it is determined whether or not the printer to be deleted is a printer that performed preceding printing (S112).

When it is determined to be the printer that performed preceding printing (S112: YES), the dummy port is set to the port of the printer driver 110 (S113). The deletion process ends after S113. In contrast, when it is determined not to be the printer that performed the preceding printing (S112: NO), switching of a port is not necessary. For this reason, the deletion process ends without switching a port.

As described above, even when the printer that performed the preceding printing, that is, the printer designated as the current port is deleted, the dummy port is set. The reason is that a port designated for the next printing is not known. In other words, if the printer driver 110 automatically sets a new port after deletion of the current port, output from an unintended printer may be carried out. Therefore, the dummy port is set in the universal printer driver after the printer designated as the current printer is deleted, thereby avoiding output from an unintended printer.

(4) Data Output Process (4-1) First Embodiment

Figure 7:
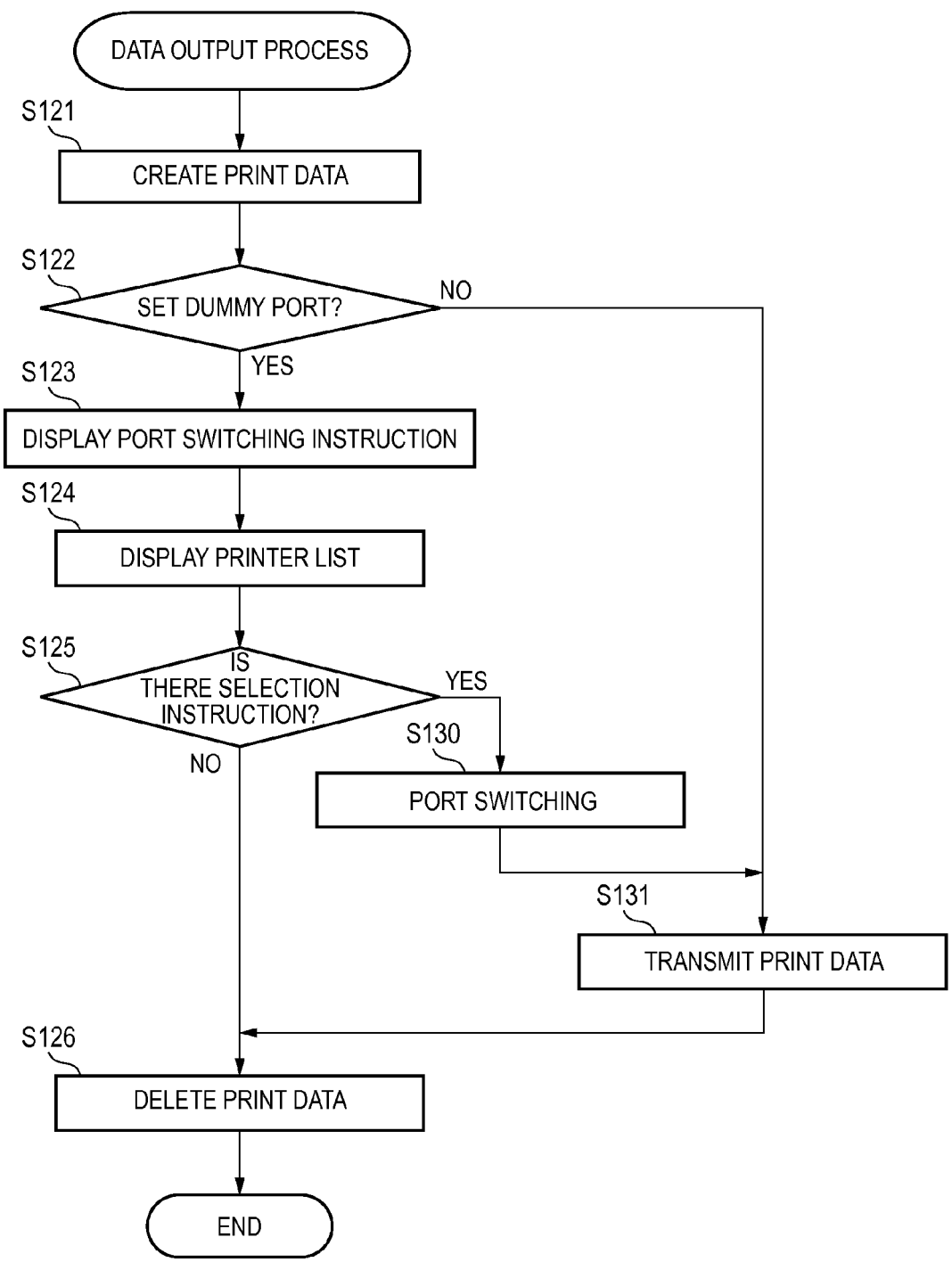
FIG. 7 is a flowchart showing a procedure of a data output process according to a first exemplary embodiment of the invention.

Next, a data output process for outputting print data (one example of a creation unit, an output unit, a determination unit, a display unit, and a deletion unit) will be described with reference to the flowchart of FIG. 7. The data output process is executed by the printer driver 110 when a print instruction is input from an application program or the like.

In the data output process of the first embodiment, first, print data in a PDL format is created based on data acquired from the application program (S121). In S121, the data is created in response to the printer designated as a port. Next, it is determined whether or not the port of the printer driver 110 is set to the dummy port (S122).

Figure 8:
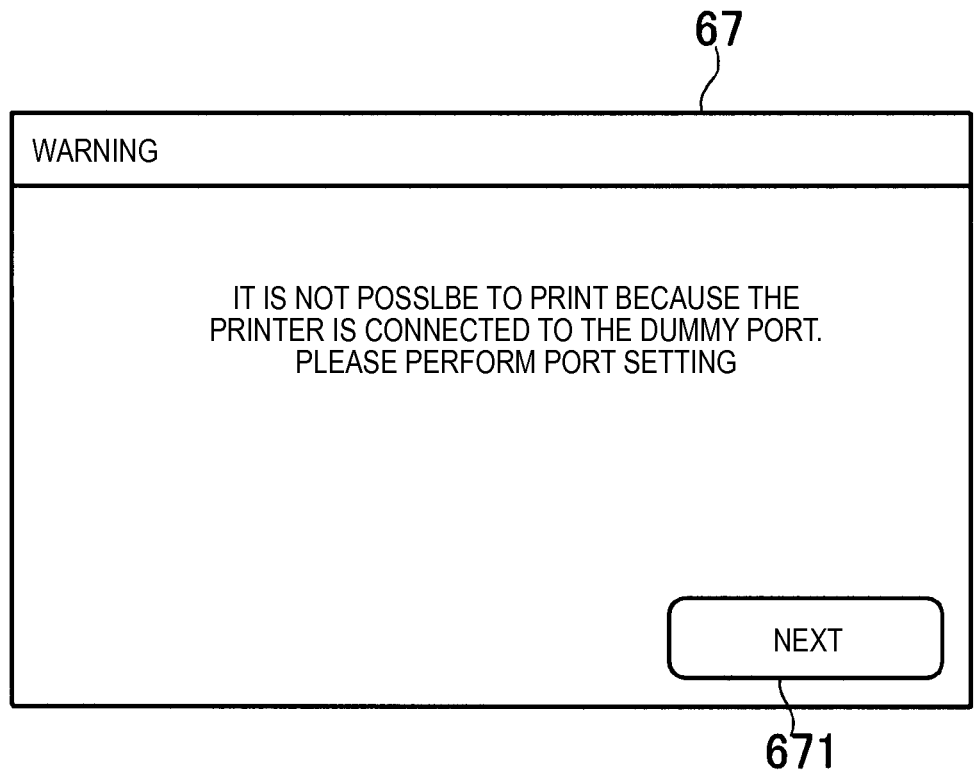
FIG. 8 is a diagram showing a display example of a message screen to instruct for switching.

When the port is set to the dummy port (S122: YES), the print data cannot be transmitted. Thus, a message screen 76 (one example of a first operation screen) for instructing switching of a port as shown in FIG. 8 is displayed (S123). Then, when a next button 671 of the message screen 67 is pressed, the dialog box 60 is activated and the printer list screen 66 (refer to FIG. 4) is displayed (S124).

After S124, it is determined whether or not there has been a printer selection instruction (S125). When there is no printer selection instruction, in other words, when the dialog box 60 ends without selecting a printer (S125: NO), the print data created in S121 is deleted from the PC 100 (S126). With the deletion of the print data, accumulation of the print data in the PC 100 can be avoided. After S126, the data output process ends.

In contrast, when there is the print selection instruction (S125: YES), the port is switched to the selected printer (S130). Thus, the print data is transmitted through the switched port (S131). In addition, when the port has not been set to the dummy port (S122: NO), a port connected to the printer is set, and therefore, the print data is transmitted to the printer through the set port (S131). After the completion of S131, the print data is deleted from the PC 100 (S126), and the data output process ends. Incidentally, printing of the print data is started in the printer to which the print data is transmitted.

In the data output process of the first embodiment, the message screen 67 prompting the switching of a port is displayed when the print data is to be transmitted to the dummy port, and the printer list screen 66 enabling the switching of a port is displayed. Accordingly, attention for the switching of a port can be called to a user, and the print data can be transmitted by the switching of a port. As a result, it is expected that accumulation of non-printed data in the PC 100 can be avoided.

Incidentally, in the first embodiment, when the dummy port has not been switched (S125: NO), the print data is deleted from the PC 100. Alternatively, the print data may remain in the PC 100. In the first embodiment, by displaying the message screen 67 for prompting the switching of a port when the dummy port has not been set, it is possible to at least inform the user that the print data cannot be transmitted. For this reason, it is expected that voluntary operation of port switching is performed by the user, and as a result, that accumulation of the non-printed data in the PC 100 is avoided.

(4-2) Second Embodiment

Figure 9:
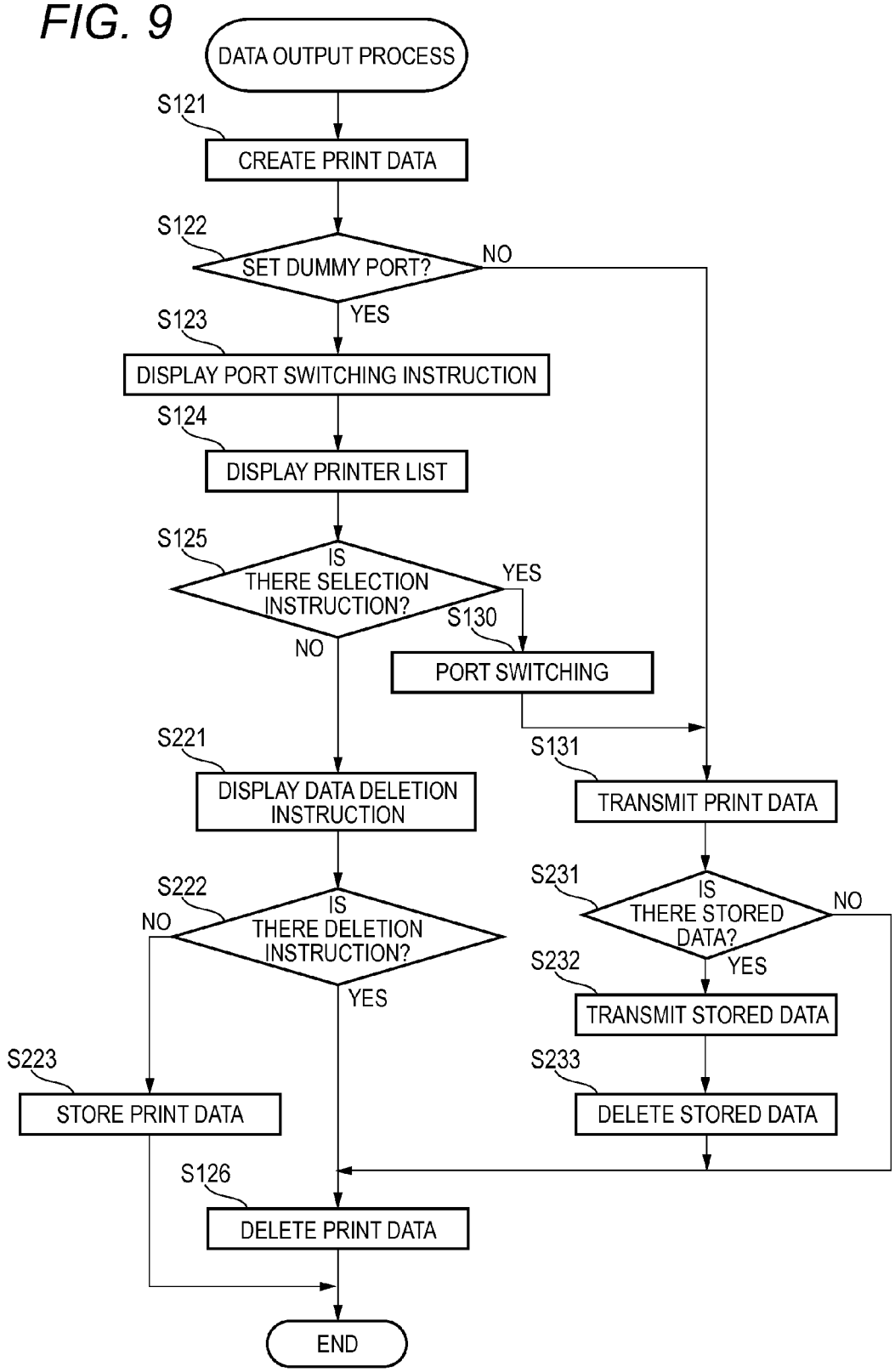
FIG. 9 is a flowchart showing a procedure of a data output process according to a second exemplary embodiment of the invention.

Next, another embodiment of the data output process will be described with reference to the flowchart of FIG. 9. In the data output process of a second embodiment, when the port is not switched, it is confirmed whether or not print data is to be deleted. This is a different point from the first embodiment in which the print data has to be deleted when the port is not switched. Furthermore, in the description of the second embodiment, the same process as in the first embodiment will be given with the same reference numerals, and description thereof will be omitted.

In the data output process of the second embodiment, first, print data is created based on data acquired from an application program (S121). Next, it is determined whether or not the port of the printer driver 110 is set to the dummy port (S122).

Figure 10:
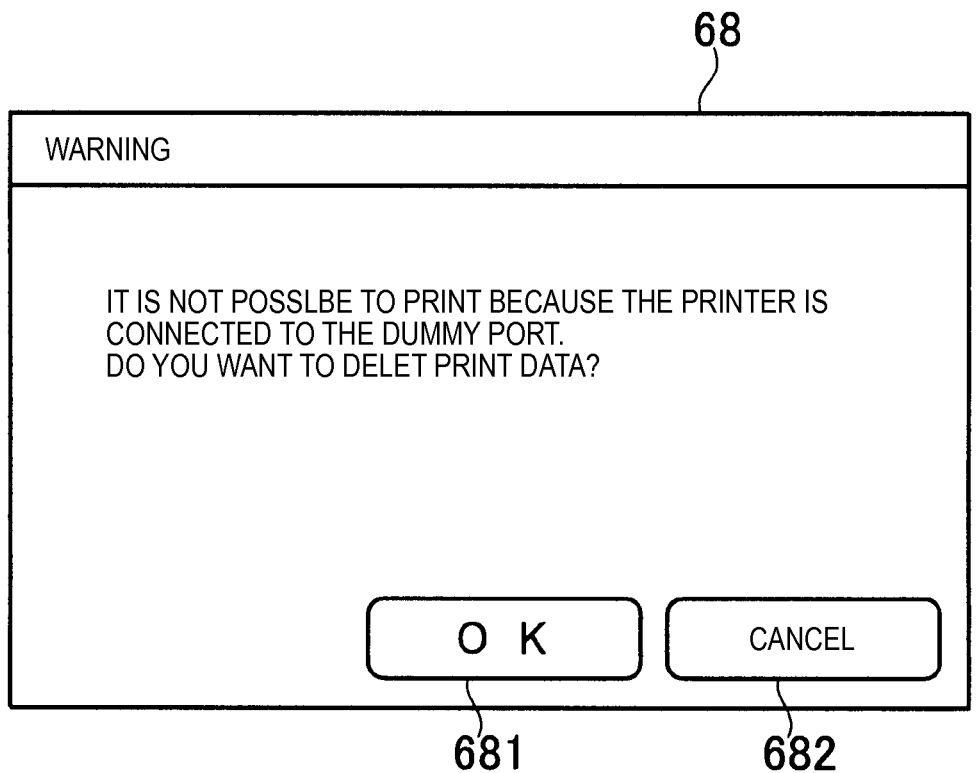
FIG. 10 is a diagram showing a display example of a message screen to instruct deletion.

When the port is set to the dummy port (S122: YES), the message screen 67 for instructing port switching is displayed (S123), and then the printer list screen 66 is displayed (S124). Then, it is determined whether or not there has been a printer selection instruction (S125). When there is no printer selection instruction (S125: No), a message screen 68 (an example of a second operation screen) for inquiring whether or not the print data is to be deleted is displayed as shown in FIG. 10 before the print data is deleted from the PC 100 (S221). Then, it is determined whether or not a deletion instruction has been received (S222).

When a deletion instruction of the print data is received, in other words, when an OK button 681 in the message screen 68 is pressed (S222: YES), the print data created in S121 is deleted from the PC 100 (S126), and the data output process ends. In contrast, when the deletion instruction of the print data has not been received, in other words, when a cancel button 682 in the message screen 68 is pressed (S222: NO), the print data created in S121 is stored in the HDD 54 (S223), and the data output process ends.

When the port has not been set to the dummy port (S122: NO), or when there is a selection instruction of a printer (S125: YES) and the port is switched (S130), the print data is transmitted to the printer (S131). Then, it is determined whether or not there is the print data (hereinafter, referred to as "stored data") stored in S223 (S231). When there is stored data (S231: YES), the stored data is also transmitted to the printer (S232). After the stored data is transmitted, the transmitted stored data is deleted from the PC 100 (S233). After S233, or if there is no stored data (S231: NO), the transmitted print data is deleted from the PC 100 (S126), and the data output process ends.

In the data output process of the second embodiment, it is inquired whether or not the print data is to be deleted without immediately deleting the print data from the PC 100 even when the port has not been switched. In addition, when the print data is not to be deleted, the print data is stored, and the stored data is transmitted after port switching. Accordingly, a user can recognize the deletion of the print data. Furthermore, non-deletion of the print data can be selected. In this case, since the print data is remained, an effort to repeat the same print instruction can be saved.

Incidentally, in the second embodiment, printing of the stored data is interlocked with printing of other print data, but it is not limited thereto. For example, when a user activates the dialog box 60 at a time point not relating to printing, upon the port of the print driver 110 being switched from the dummy port to another port, the stored data may be output through the switched port. In addition, it may be configured such that a button for instructing printing of the stored data is arranged in the dialog box 60, and the stored data may be output when the button is pressed.

(4-3) Third Embodiment

Figure 11:
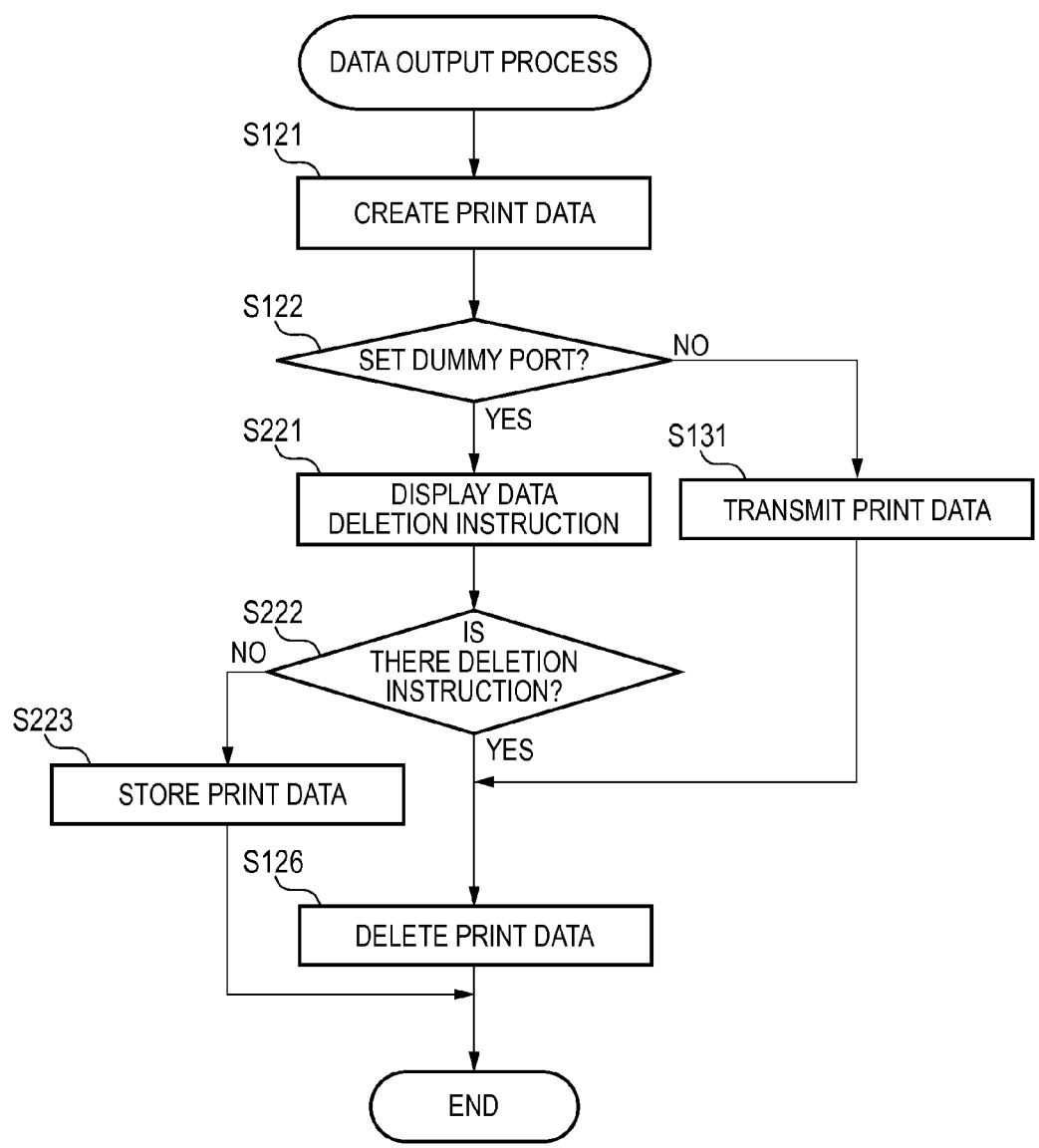
FIG. 11 is a flowchart showing a procedure of a data output process according to a third exemplary embodiment of the invention.

Next, a third embodiment of the data output process will be described with reference to the flowchart of FIG. 11. In the data output process of the third embodiment, when print data cannot be transmitted, it is confirmed whether or not the print data is to be deleted without performing switching of a port. This is a different point from the first and the second embodiments in which the switching of a port is inquired first when the print data cannot be transmitted. Furthermore, in the description of the third embodiment, the same processes as in the first and the second embodiments are given with the same reference numerals, and description thereof will be omitted.

In the data output process of the third embodiment, first, print data is created based on data acquired from an application program (S121). Next, it is determined whether or not the port of the printer driver 110 is set to the dummy port (S122). When the port is not set to the dummy port (S122: NO), the print data is transmitted to the printer (S131). After completing S131, the print data is deleted from the PC 100 (S126), and the data output process ends.

In contrast, when the port is set to the dummy port (S122: YES), the message screen 68 (refer to FIG. 10) for inquiring whether or not the print data is to be deleted is displayed (S221). When a deletion instruction of the print data is received (S222: YES), the print data created in S121 is deleted from the PC 100 (S126), and the data output process ends. When the deletion instruction of the print data has not been received (S222: NO), the print data created in S121 is stored in the HDD 54 (S223), and the data output process ends.

In the data output process of the third embodiment, when the print data is to be transmitted to the dummy port, a screen for instructing the deletion of the print data is immediately displayed instead of prompting switching of a port by displaying the printer list screen 66. Accordingly, it is expected that attention of deleting the print data is called to the user, and accumulation of the print data in the PC 100 is avoided by instructing the deletion.

Incidentally, non-deletion can be selected (in other words, the cancel button 682 is pressed) in the message screen 68 displayed when the dummy port is set, but the print data may be automatically deleted from the PC 100. For example, the deletion may be compulsorily performed without displaying the message screen 68. Alternatively, it may be configured that the deletion of the print data is inevitably selected by displaying only the OK button 681 in the message screen 68.

As described above, the PC 100 (printer driver 110) of the exemplary embodiments can be expected to switch to a port connected to a printer by displaying the message screen 67 for instructing port switching and prompting the port switching when the dummy port that is a non-connected port is designated. When the port is switched, since print data is output through the switched port after that, accumulation of the print data in the PC 100 can be avoided. Or, when the dummy port is designated, deletion of the print data can be expected by displaying the message screen 68 for instructing the deletion of the print data and prompting the deletion of the print data. Accordingly, the print data can be hardly accumulated in the PC 100.

Furthermore, the exemplary embodiments of the invention are just simple examples, and they do not limit the invention. Therefore, the invention of course can be improved and modified within a range not departing from the scope of the invention. For example, the printer may be one equipped with a print function, and can be applied even to multi-function devices and copy machines. In addition, a print control device is not limited to PCs. For example, the device may be personal digital assistances or workstations.

In addition, in the above-described exemplary embodiments, the printer is connected to the network 400, but it is not limited thereto. For example, a USB connection, a parallel cable connection, and the like are possible.

Moreover, in the above-described exemplary embodiments, a plurality of printers is connected to the PC 100 through the network 400, but the PC 100 may control a plurality of kinds of printers, and does not have to control a plurality of printers. In other words, the invention can be applied to a case where there is only one printer to be controlled.

Furthermore, in the above-described exemplary embodiments, when print data is to be transmitted to the dummy port, the message screen 67 or 68 is displayed, but it is not limited to the dummy port. In other words, a port that is not connected to a printer may be possible. Alternatively, a port that is set to a wrong address (for example, a case where an address used by a user in the past is stored, and a different address from the stored address is set, or a case where the range of available addresses is defined, and an address beyond the range is designated) may be possible.

In addition, in the above-described exemplary embodiments, the invention is applied to the universal printer driver, but it is not limited to the universal printer driver. For example, even if it is a printer driver compatible only with one model, the message screen 67 or 68 may be displayed when print data is to be transmitted to a non-connected port to a printer.

Furthermore, in the above-described exemplary embodiments, after a printer is selected in the printer list screen 66, print data is transmitted to a printer through a port after the selection in print data process. In addition, it can be configured such that succeeding jobs accumulated in the queue during the selection of a printer are also transmitted to the printer through the port after the selection.

According to another aspect of the invention, in the print control device, wherein when the port is switched through the first operation screen, the output unit outputs the print data that the determination unit determines to output to the non-connected port to the printing device via the switched port.

By using the print data that has been created in advance without change, a user can reduce labor to perform a print operation again.

According to still another aspect of the invention, in the print control device, wherein when the output unit outputs the print data that the determination unit determines to have been output to the non-connected port to the printing device through the switched port, the output unit outputs other print data stored in the print control device to the printing device through the switched port.

According thereto, it is not necessary to repeat the same process for a plurality of print jobs. Furthermore, other print data may be, for example, print data accumulated in a job queue (succeeding job), and may be print data stored in a separate storage area (preceding job) at a time when it is determined to be output via the non-connected port before.

According to still another aspect of the invention, the print control device further comprises: a selection unit that selects a printing device; and a switching unit that switches the port so that the printing device selected by the selection unit becomes the output destination of print data, wherein the creation unit creates the print data in response to the printing device selected by the selection unit.

There are many cases where the print data is set to output via the non-connected port in a driver having the above-described selection unit and the switching unit (for example, a universal driver). For such cases, the invention works favorably.

According to still another aspect of the invention, in the print control device, wherein the determination unit determines a virtual port set immediately after installation of a driver as the non-connected port.

It is possible to suppress the print data to be output to a printing device other than one in the setting by having the port immediately after the installment to be a virtual port indicating that a port has not been set. On the other hand, a large amount of print data accumulates if the output of the print data through the virtual port is repeated. However, switching of the port and deletion of the print data are prompted by setting the virtual port to a non-connected port, and thereby avoiding accumulation of the print data.

According to still another aspect of the invention, the print control device further comprises: a designation unit that designates a port as a virtual port when the port is not connected to a printing device corresponding to a designated port, wherein the determination unit determines the virtual port as the non-connected port.

By setting a port that has been in non-connection with a printing device corresponding to the designated port to be a virtual port, it is possible to suppress the print data from outputting to a printing device other than one in the setting. On the other hand, a large amount of print data is accumulated when output of the print data through the virtual port is repeated. However, by setting the virtual port to a non-connected port, switching of the port and deletion of the print data are prompted and thus accumulation of the print data can be avoided.

According to still another aspect of the invention, the print control device further comprises: a deletion unit that deletes print data that the determination unit determines to be output to the non-connected port when port switching is not performed through the first operation screen.

When the port is not switched even though switching of the port is prompted, it is preferable not to leave the print data by deleting the print data.

What is claimed is:

1. A print control device comprising:
    an output device;
    a display device;
    a processor; and
    memory storing computer-readable instructions that, when executed by the processor, cause the print control device to:
    create print data;
    control the output device to output the print data to a printing device through a designated port;
    determine whether or not the designated port is a non-connected port that is a virtual port not connected to any printing devices, wherein the virtual port is configured to be designated in response to installation of a driver configured to control a plurality of printing devices; and
    control the display device to, when it is determined that the designated port is the non-connected port, display at least one of a first operation screen that is an operation screen for instructing port switching and a second operation screen that is an operation screen for instructing deletion of the print data;
    wherein the memory stores further computer-readable instructions that, when executed by the processor, cause the print control device to:
    determine whether or not a printing device has been deleted from a list of printing devices;
    when it is determined that the printing device has been deleted from the list of printing devices, determine whether or not the printing device performed preceding printing; and
    when it is determined that the printing device did perform preceding printing, designate the virtual port as a port to be used by the driver.

2. The print control device according to claim 1,
    wherein when the designated port is switched from the non-connected port to a switched port which is connected to the printing device through the first operation screen, the output device outputs the print data to the printing device via the switched port.

3. The print control device according to claim 2,
    wherein when the output device outputs the print data to the printing device via the switched port, the output device outputs other print data stored in the print control device to the printing device via the switched port.

4. The print control device according to claim 1, wherein the memory stores further computer-readable instructions that, when executed by the processor, cause the print control device to:
    select the printing device from the plurality of printing devices; and
    switch the designated port from the non-connected port to a switched port which is connected to the printing device so that the printing device becomes an output destination of print data, wherein the print data is created in response to the selection of the printing device.

5. The print control device according to claim 1, wherein the memory stores further computer-readable instructions that, when executed by the processor, cause the print control device to:
designate a port as the virtual port when the port is not connected to any of the plurality of printing devices.

6. The print control device according to claim 1, wherein the memory stores further computer-readable instructions that, when executed by the processor, cause the print control device to:
delete the print data when the designated port is the non-connected port and when port switching is not performed through the first operation screen.

7. A print control method by a print control device having a port connectable to a printing device, the print control method comprising:
creating print data;
outputting the print data to a printing device through a designated port;
determining whether or not the designated port is a non-connected port that is a virtual port not connected to any printing devices, wherein the virtual port is configured to be designated in response to installation of a driver configured to control a plurality of printing devices;
when it is determined that the designated port is the non-connected port, displaying at least one of a first operation screen that is an operation screen for instructing port switching and a second operation screen that is an operation screen for instructing deletion of the print data;
determining whether or not a printing device has been deleted from a list of printing devices;
when it is determined that the printing device has been deleted from the list of printing devices, determining whether or not the printing device performed preceding printing; and
when it is determined that the printing device did perform preceding printing, designating the virtual port as a port to be used by the driver.

8. The print control method according to claim 7, further comprising:
switching the designated port from the non-connected port to a switched port which is connected to the printing device; and
outputting the print data to the printing device via the switched port.

9. The print control method according to claim 7, further comprising:
deleting the print data when the designated port is not switched through the first operation screen.

10. A non-transitory computer-readable medium having a computer program stored thereon and readable by a computer, said computer program, when executed by the computer, causes the computer to function as:
a creation unit that creates print data;
an output unit that outputs the print data created by the creation unit to a printing device through a designated port;
a first determination unit that determines whether or not the designated port is a non-connected port that is a virtual port not connected to any printing devices, wherein the virtual port is configured to be designated in response to installation of a driver configured to control a plurality of printing devices;
a display unit which, when the first determination unit determines that the designated port is the non-connected port, displays at least one of a first operation screen that is an operation screen for instructing port switching and a second operation screen that is an operation screen for instructing deletion of the print data;
a second determination unit which determines whether or not a printing device has been deleted from a list of printing devices;
when the second determination unit determines that the printing device has been deleted from the list of printing devices, a third determination unit which determines whether or not the printing device performed preceding printing; and
when the third determination unit determines that the printing device did perform preceding printing, a designation unit which designates the virtual port as a port to be used by the driver.

* * * * *